Nov. 13, 1928.  
M. A. MIKESH  
REVERSE BRAKE  
Filed July 18, 1927  
1,691,907
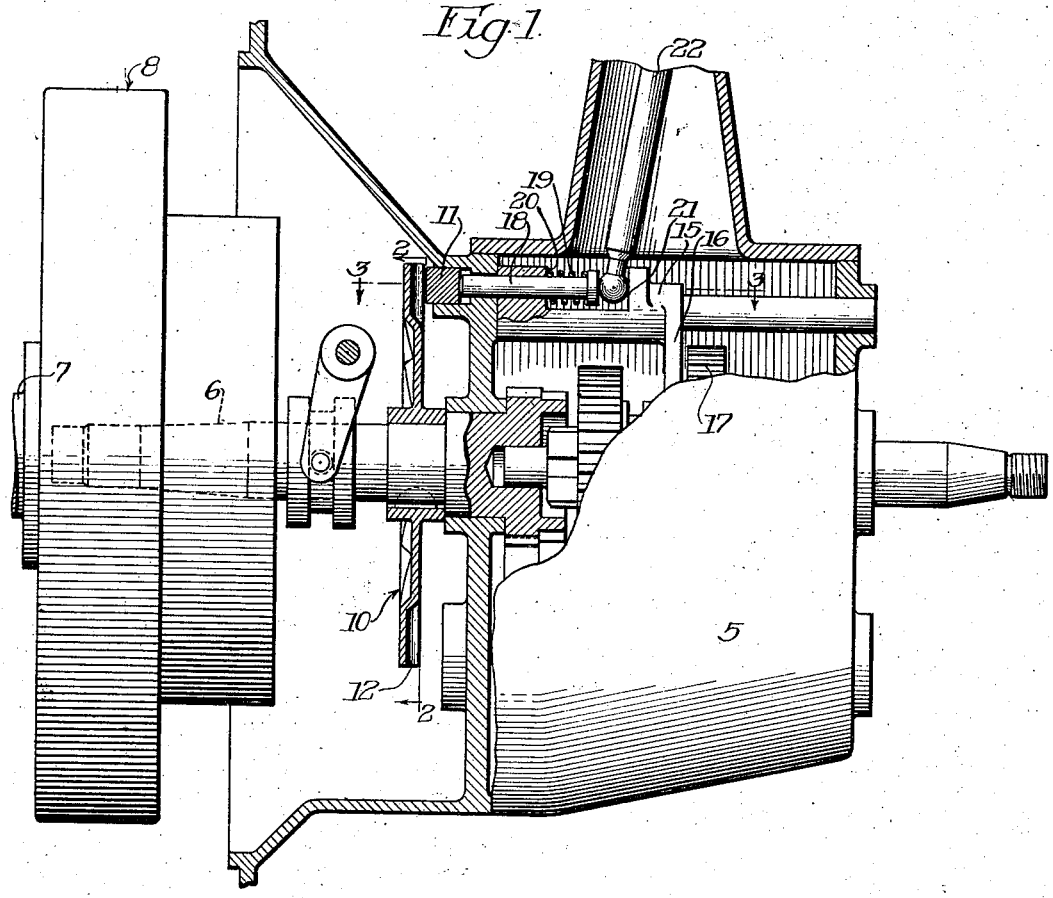
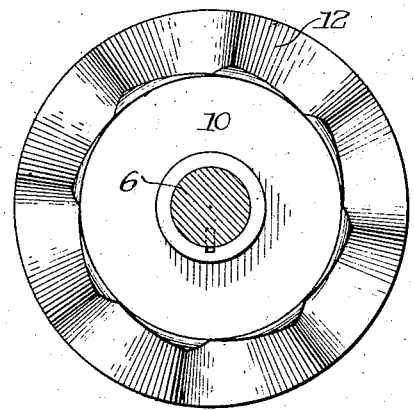
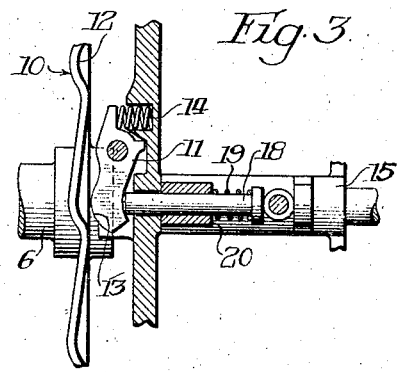
Inventor:  
M. A. Mikesh  
By Chindall, Parker & Carlson  
Attys Patented Nov. 13, 1928.

1,691,907

UNITED STATES PATENT OFFICE.

MARTIN A. MIKESH, OF JERSEY CITY, NEW JERSEY.

REVERSE BRAKE.

Application filed July 18, 1927. Serial No. 206,485.

My invention relates to an auxiliary brake for automobiles operated in conjunction with the transmission, and its primary object resides in the provision of a quickly and easily operable means which will enable the operator to overcome the reverse movement of the car when the latter has been halted in ascending a grade in the roadway.

Another object is to provide a reverse brake which is operable by an overthrow of the transmission shifting lever.

A further object is to provide such a brake in which the braking surfaces are angularly disposed with relation to the plane of movement of the body to be braked so that sudden and positive gripping of the parts is avoided.

Other objects and advantages will become apparent from the following description and from the drawings, in which:

Figure 1 is a fragmentary vertical sectional view taken longitudinally of the transmission gear housing of an automobile embodying the principles of my invention.

Fig. 2 is an elevational view partially in section taken along the line 2—2 of Fig. 1.

Fig. 3 is a fragmentary plan view of the brake taken partially in section along the line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary embodiment chosen for disclosure herein I have shown a common form of transmission gearing located in a housing 5 which may be mounted on an automobile frame in any preferred manner. A clutch shaft 6 is provided having one of its ends rotatably mounted in one end of the housing 5 and extending longitudinally therefrom to another bearing in the end of a crank- shaft 7. The clutch shaft 6 is normally rotatable with respect to the crank shaft 7 but may be connected for rotation therewith by means of any preferred clutch mechanism such as the clutch herein shown and designated generally by the numeral 8.

Means is provided to prevent undesired reverse motion of the vehicle. It will be apparent that such reverse motion could be prevented by stopping the rotation of any of the shafts which are operatively connected to the wheels of the vehicle. I prefer to provide a brake disk 10 mounted on the clutch shaft 6 near its bearing in the end of the housing 5, and to mount a braking member 11 in the housing 5 so that it may be pressed therefrom into engagement with the disk 10.

The brake disk 10 is provided with radial corrugations 12, best shown in Fig. 3, these corrugations being in such a position that they may be engaged by the braking member 11.

The braking member 11 is herein shown as comprising a lever pivoted intermediate its ends and having one end 13 adapted to fit into the corrugations 12 in the brake disk 10. The end 13 of the lever is normally held out of contact with the disk by means of an expansive coil spring 14 mounted in the housing 5 and engaging the opposite end of the lever.

Means is provided whereby the end 13 of the lever may be pressed into contact with the brake disk 10 by movement of the transmission gear shift while the transmission gears are in their low speed position.

This means is herein shown as associated with a slide member 15 which has a forked member 16 mounted thereon for moving the low gear 17, and comprises a headed pin 18 which is mounted for longitudinal sliding movement with respect to the slide member 15. The pin is adapted to engage the braking member 11 but is normally held out of contact therewith by an expansive coil spring 19 mounted about the pin 18 between its head and an abutment 20 formed on the slide member 15.

Between the head of the pin 18 and an abutment 21 formed on the slide member 15, a recess is formed which is adapted to receive the lower end of a conventional gear shift lever 22, so that the slide 15 may be moved under the guidance of the lever 22.

The spring 19 is preferably of sufficient strength to withstand compression by the force ordinarily necessary for the movement of the slide 15. It will be apparent that after the low gear has reached its operative position and the movement of the slide has been stopped, a further movement of the lower end of the lever 22 to the left in Fig. 1 will compress the spring 19, force the pin 18 to the left and press the braking member 11 into contact with the brake disk 10.

In order to overcome the objectionable positive grip afforded by a ratchet and pawl brake, it should be noted that the engaging surface 13 of the braking member 11 is curved to fit into the corrugations 12 and this surface 13 and the surface of the corrugations 12 will act as cams with respect to each other to urge the end of the lever 11 out of the corrugation into which it is pressed.

These engaging surfaces of the braking member 11 and the brake disk 10 are, however, at a sufficiently great angle to the plane of movement of the disk 10 to materially lessen the force which must be applied to the member 11 in order to hold the vehicle in a stopped position.

It will be apparent that I have provided a reverse brake which is quickly and easily operable during the normal starting of a vehicle which has been halted in ascending a grade in the roadway.

It will also be apparent that the reverse brake which I have provided is operable by a slight overthrow of the transmission shifting lever and that it will not operate with a sudden and positive gripping action.

This application forms a continuation in part of my copending application No. 8,055 filed Feb. 9, 1925.

I claim as my invention:

1. In an automobile, a transmission shaft, a transmission shifting lever, a brake disk fixed on said shaft, said disk having radial corrugations formed therein, a braking member adapted to fit into the corrugations in said disk but normally out of contact therewith, and connections between said lever and said member whereby said member may be brought into braking relation to said disk by movement of said lever.

2. In an automobile, a transmission lever, a transmission shaft, a braking disk fixed on said shaft, said disk having radial corrugations formed therein, a braking member for engaging said disk, said disk and said member having cam surfaces engaging each other which tend to force said member away from said disk when said disk rotates in either direction, and means between said member and said lever whereby said member may be moved by said lever.

3. The combination with a transmission gearing system having a plurality of shafts, a plurality of gears including a low speed gear which has operative and inoperative positions and a slidable member operable in its longitudinal sliding movement to move said low gear into operative position, and a shifting lever operable to move said slidable member, of a reverse brake comprising a disk mounted on one of said shafts, the outer peripheral edges of said disk having radial corrugations, a braking member, a resilient means normally holding said braking member away from said disk, and an operative connection between said shifting lever and said braking member whereby said braking member may be caused to engage the corrugated portion of said disk by moving said shifting lever beyond the position necessary to put said low gear in operative position.

4. The combination with an automobile transmission having a gear shift lever which is movable from a neutral position to a plurality of other positions so as to place said transmission in gear, of a normally inoperative reverse brake and applying means for said brake operable by said lever by moving said lever from its neutral position through and to a point beyond one of its other positions.

5. The combination of a surface to be braked, said surface having corrugations laterally of its direction of motion and a braking member adapted to be pressed into contact with the surface and to fit into said corrugations, said member having cam surfaces adapted to cooperate with the sides of the corrugations so that relative movement of the parts will tend to press said member outwardly of the corrugations.

6. In a reverse brake, a disk having radial corrugations, said disk being fixed upon the member to be braked, and a braking member operable to engage said disk to prevent rotation thereof, said disk and said braking member presenting cam surfaces tending to move the braking member out of the depressions formed by the corrugations and thereby to allow the disk to rotate.

7. The combination with a rotatable shaft of a device operable to exert a force to resist rotation of said shaft, and cam means operable to overcome said force so as to allow rotation of said shaft.

8. In an automobile, a transmission shifting lever, a transmission shaft, and connections between the said lever and shaft operable to transmit force applied to said lever to apply braking pressure to the shaft.

9. In an automobile, a transmission, a transmission shifting lever, a transmission shaft, a clutch upon the latter, and means operable by the lever to engage the clutch without disturbing the position of said transmission and restrain reverse rotation of the shaft.

10. In an automobile, a transmission lever, a transmission shaft, a clutch on the shaft comprising a fixed member and a part in frictional engagement therewith, in combination with a pawl operable by movement of the transmission lever into engagement with said frictional engaging part, to restrain rotation of the shaft.

11. In an automobile, a transmission shaft, braking means thereon for arresting backward movement of the car while geared for forward movement, a transmission lever, and connections therefrom operable while said car is geared for forward movement to render the braking means either operative or inoperative.

12. In an automobile, a transmission shaft, normally inoperative braking means thereon, a transmission lever, and connections therefrom operable to render the braking means operative by further movement of the transmission lever after it has been shifted into starting gear, thereby arresting backward movement of the car.

In testimony whereof, I have hereunto affixed my signature.

MARTIN A. MIKESH.